United States Patent [19]
Vox

[11] 3,796,533
[45] Mar. 12, 1974

[54] ROTARY MOLDING MACHINE

[76] Inventor: Anton J. Vox, Strada Cantonale, CH-6816 Bissone, Tessin, Switzerland

[22] Filed: Jan. 4, 1972

[21] Appl. No.: 215,331

[30]     Foreign Application Priority Data
   Jan. 15, 1971   Germany................ P 21 01 675.1

[52] U.S. Cl.................................. 425/429, 425/435
[51] Int. Cl. ............................................. B29c 5/04
[58] Field of Search ........... 425/425, 429, 430, 435, 425/402

[56]            References Cited
          UNITED STATES PATENTS
3,055,054   9/1962   Cox et al. ..................... 425/425 X
3,566,443   3/1971   Guerrero ....................... 425/435 X
2,967,329   1/1961   Friedland et al................ 425/430 X
3,337,662   8/1967   Spencer......................... 425/429 X

*Primary Examiner*—Robert L. Spicer, Jr.
*Attorney, Agent, or Firm*—Craig and Antonelli

[57]                ABSTRACT

A rotary molding machine for producing articles of plastic which comprises at least one rotary frame of a shape similar to that of a so-called gyrowheel or Rhönwheel which is driven about a horizontal main axis and is supported on rollers and in which a table or the like is rotatably mounted on which a mold is to be supported and which together with the mold is driven about an axis extending transversely to the main axis. By employing such a rotary frame, it is possible to mount molds on the rotary frame which far exceed the dimensions of the molds which could previously be employed in rotary molding machines for producing plastic articles.

23 Claims, 8 Drawing Figures

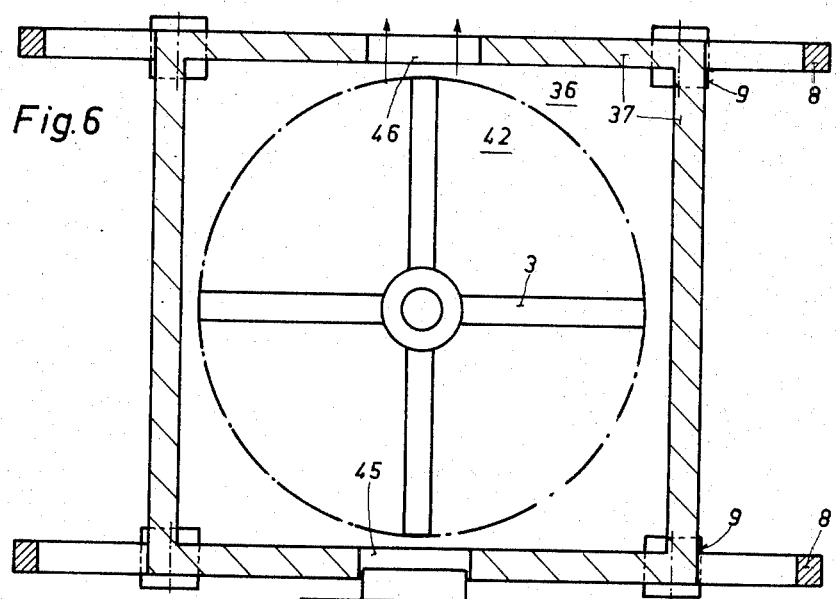
Fig. 6
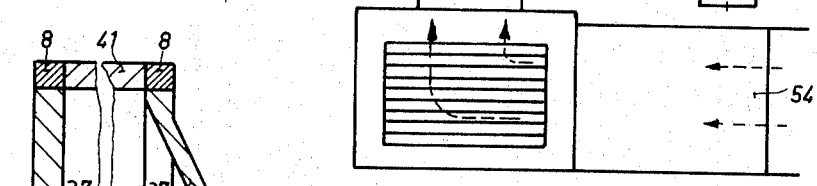
Fig. 7   Fig. 8
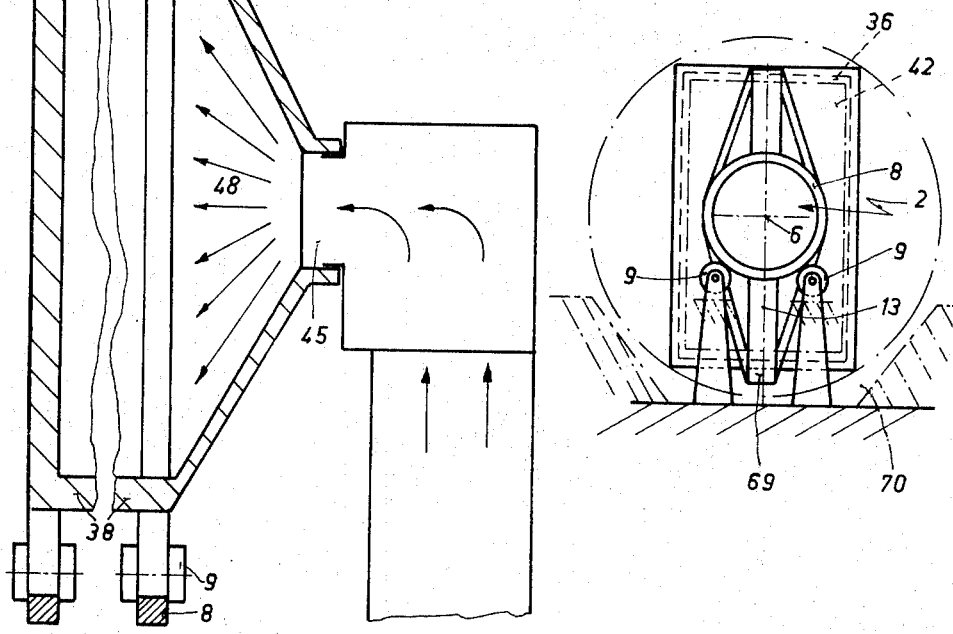

ROTARY MOLDING MACHINE

The present invention relates to a rotary molding machine for producing articles of plastic within a hollow mold which is adapted to be heated and/or cooled and is mounted on a rotary table which, in turn, is located within a rotary frame which is rotatable completely about a horizontal axis, the so-called main axis, and within which the rotary table is rotatable completely about an axis, the so-called secondary axis, which extends at an angle and preferably a right angle to the horizontal main axis of the frame.

Such rotary molding machines are employed for producing molded plastic articles, for example, open or closed containers, shell-shaped parts or the like by inserting a plastic in the form of granules or a powder, or in a pasty or liquid condition into the mold and by depositing the plastic on the inner wall surface of the mold by heating the latter and rotating it at a low uniform speed until a homogenous layer of plastic is produced which, after cooling, forms a stable element. After the mold has been cooled, its rotation is stopped, whereupon the product may be removed from the mold after the latter has been opened which may be done either without removing the mold from the rotary table or after the mold has been removed from the machine and while a new mold is mounted on the table.

There are numerous modifications and designs of such rotary molding machines known in the prior art. In some of these machines, the hollow molds are provided with double walls between which a heating or cooling medium is conducted for acting directly upon the mold, while in other machines of this type the mold is inserted together with its rotating mechanism into a stationary furnace chamber in which it is then heated from the outside. The molding machines as are presently known have the disadvantage that the larger the molds have to be, the more difficult it becomes to construct and mount the rotary frame of the machine. Many of these machines are built according to the principle that the rotary table is rotatably mounted within the eccentric central section of a crankshaft which is rotatable about a horizontal axis. The ends of this crankshaft are hollow and serve for receiving a driving connection between an outer motor and the drive shaft of the rotary table. If the mold has a double wall for being heated or cooled directly, the hollow ends of the crankshaft also receive the inlet and outlet pipes for the heating or cooling medium. The larger the plastic products have to be made and therefore the larger the molds have to be in which these products are to be molded, the larger and stronger the crankshaft must be made and the longer must also be the ends of the crankshaft. This also requires the cross-sectional sizes of the inlet and outlet lines for the heating or cooling medium to be increased accordingly. Consequently, if the machines which are designed according to this principle are to be employed for very large molds they are bound to be extremely large and heavy.

It is an object of the present invention to provide a rotary molding machine of the general type as described in the first paragraph above which may be built especially for large molds of a considerably smaller size and lighter weight than the machines which are designed according to the known crankshaft principle, and in which there are also no difficulties in providing sufficient space for accommodating the inlet and outlet pipes and pipe connections for heating or cooling media and also the means for connecting the rotary table to its driving means.

For attaining this object, the present invention provides a rotary molding machine of the type as first described above in which the rotary frame is designed similar to a "gyrowheel" or "Rhönwheel" which comprises a pair of parallel wheel rims which are connected to each other by crossbars and are rotatable in a vertical position on lower supporting rollers, and between which the rotary table is mounted which carries the hollow mold.

The term "gyrowheel" or "Rhönwheel" is only used herein because of the similarity of the general shape of such an apparatus to the rotary frame of the machine according to the invention, but not because of any functional similarity. Such a gyrowheel or Rhönwheel is an apparatus used for gymnastic exercises which consists of a pair of round wheels of steel pipe of a diameter of, for example, 2 m, which are connected to each other by crossbars which serve as hand grips and feed supports for a person who is suspended thereon between the two wheels and who by swinging his body rolls the apparatus along the ground and thereby carries out complete saltos.

Such a gyrowheel is employed according to the invention as a rotary frame in which the table is rotatably mounted which carries the mold between the two wheel rims. The application of such a gyrowheel design permits the revolutionary development of entirely new kinds of rotary molding machines which may be built and operated at relatively low costs and permit the use of molds of almost any size and even of such huge sizes which prior to this invention were regarded as being impossible for actual molding operations. A rotary molding machine which is built in accordance with the gyrowheel design according to the invention has the following advantages:

Since the two rims of the gyrowheel which forms the rotary frame of the machine are rotary mounted on small supporting rollers, this frame may have a considerably shorter axial length than that required between the ends of the crankshaft of one of the known molding machines;

since the hubs of the two wheel rims of such a gyrowheel may be made of very large inner diameters, there are large spaces available in these hubs for the passage of the inlet and outlet pipes for the heating or cooling medium as well as of the means for connecting the rotary table to its driving means, and also of any lines leading from the outside to primary measuring elements and to other means which may be required between the wheel rims of the gyrowheel;

the entire rotary frame including its bearing means as well as the bearing means for the rotary table for carrying the mold within the rotary frame may be made of a very simple and solid but relatively inexpensive construction, and all the required parts of the machine are easily accessible and their operation may be easily supervised;

the mold may be easily removed in a radial direction from the area between the two wheel rims of the gyrowheel, but it is also possible, for example, if the gyrowheel is driven by means of its supporting rollers and if quick-action couplings are provided for the inlet and outlet pipes for the heating or cooling medium and also for the driving connection for the rotary table, to effect a continuous automatic cycle of molding operations by lifting the entire gyrowheel including the rotary table and the mold from the supporting rollers and to roll it away from the remainder of the machine to any suitable position in which the mold may then be opened or removed, for example, after it has remained in this position for a sufficient length of time to permit it to cool off completely, while in the meantime another gyrowheel with a newly filled mold may be mounted on the supporting rollers and another molding operation may be carried out;

due to the fact that the gyrowheel and the rotary table therein may be made of a much lighter construction than the rotary frame and the rotary table of the known machines of the crankshaft type, a considerably lower amount of power is required for driving the new machine;

since the gyrowheel may be made of any desired diameter and since the hubs of this wheel may be made large enough for passing large inlet and outlet pipes for a heating or cooling medium therethrough, it is possible to provide a gyrowheel with a furnace chamber which has heat-insulating walls and a bottom through which the bearing of the rotary table extends, the driving means of which are located at the outside of the furnace chamber;

when employing such a furnace chamber within the gyrowheel, one or both hubs of the latter may also serve as an inlet or outlet of the furnace chamber and be made of a diffuserlike shape which preferably increases conically in diameter from the actual hub to the entire height and/or width of the furnace chamber.

Instead of driving the gyrowheel by means of its supporting rollers, one or more of which may then form gear or friction wheels which engage with gear teeth or a friction layer on at least one of the wheel rims, it is also possible to run a driving chain or a drive belt over at least one of the wheel rims or over a sprocket wheel or a pulley which is secured to or integral with one of the large central hubs as previously described which is connected by spokes to the respective wheel rim of the gyrowheel.

Another feature of the invention consists in mounting the motor for driving the rotary table on the gyrowheel itself and in connecting this motor by a slip ring or the like to a source of current at one side of the gyrowheel. Since the hubs of the gyrowheel have a large inner diameter, such a slip ring may be easily mounted in or on one of these hubs. Such a manner of mounting this motor on the gyrowheel itself provides an extremely simple means for driving the rotary table.

Another feature of this invention consists in mounting on the outer end of the bearing of the rotary table or on the furnace chamber one or more temperature measuring instruments which are rotatable with the rotary table and are connected to a wireless transmitter for transmitting the measurements to an indicating instrument which is located on the outside of the machine or at a point remote therefrom. This measuring instrument is provided with primary measuring elements which project into the mold for measuring the temperature of the latter and/or of the plastic material. It is thus possible to measure the temperature directly on or within the mold and to control the heating or cooling operation accordingly so that inaccurate temperature measurements of the respective medium will no longer occur as they did occur previously when measuring the temperature of the medium before passing it into the rotary apparatus.

These and additional features and advantages of the present invention will become further apparent from the following detailed description thereof when read with reference to the accompanying diagrammatic drawings, in which FIGS. 1 to 3 respectively show a front view, a side view and a top view of a rotary molding machine according to a first embodiment of the invention;

FIG. 6 shows a cross section which is taken along the line VI — VI of FIG. 5;

FIG. 7 shows a cross section of a modification of a part of the molding machine according to FIG. 4; while FIG. 8 shows a highly reduced side view similar to FIG. 2 of a further embodiment of the invention.

Figure 1:
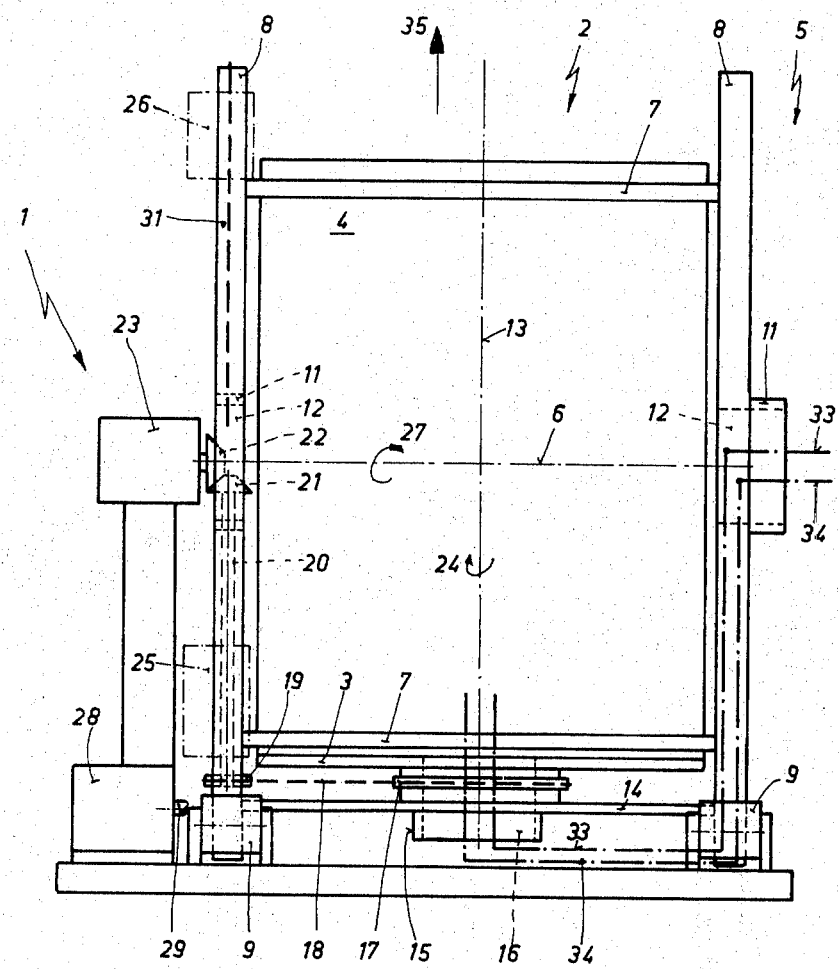
Figure 2:
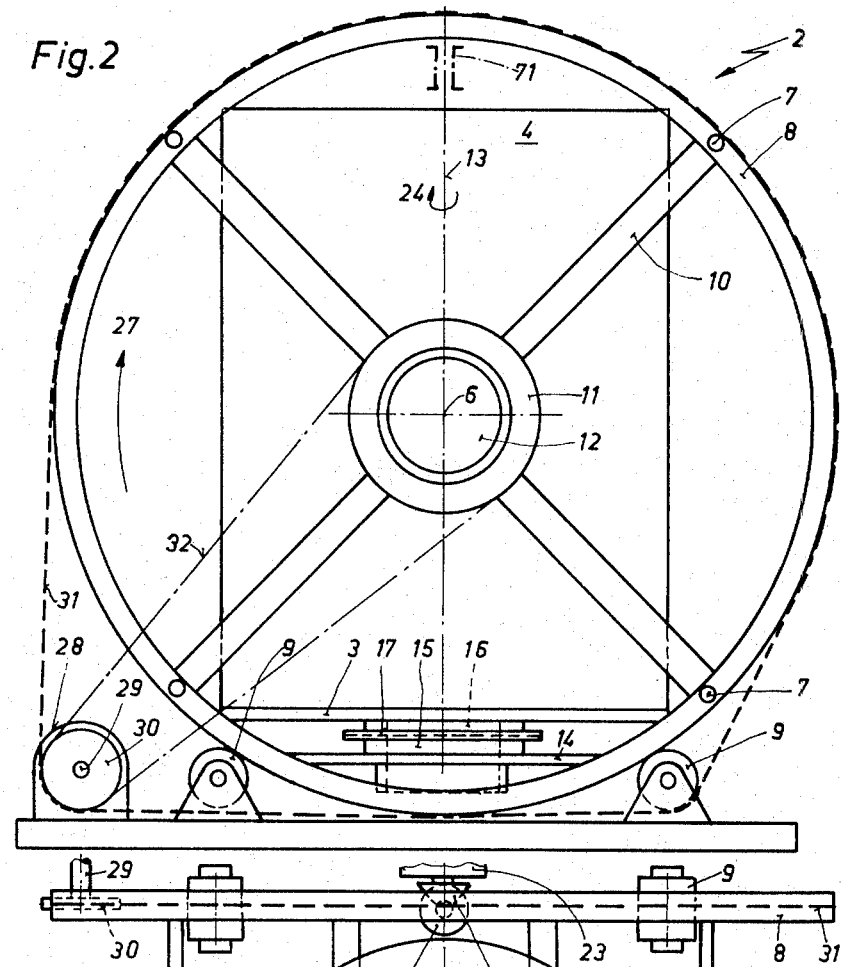
Figure 3:
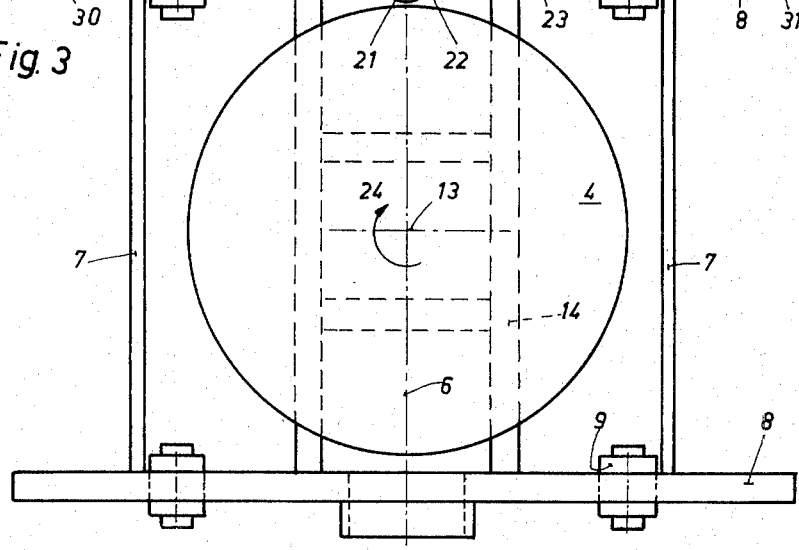

The rotary molding machine according to a first embodiment of the invention as illustrated in FIGS. 1 to 3 comprises a driving side 1, a gyrowheel or Rhonwheel 2 with a rotary table 3 on which a mold 4 is mounted, and a machine side 5, not shown in detail, which contains the elements for heating the heating medium or for cooling the cooling medium. The gyrowheel 2 is a circular frame which is rotatable about a horizontal axis 6 and essentially consists of two parallel wheel rims 8 which are connected to each other by crossbars 7 and each of which is rotatably supported on a pair of supporting rollers 9. Each rim 8 surrounds a central hub ring 11 which has a round aperture 12 of a large diameter of, for example, 200 mm and is secured to the respective rim 8 by spokes 10.

The rotary table 3 and the mold 4 are located between the two wheel rims 8 and have a central axis of rotation 13 which extends parallel to the planes of the rims 8. The two wheel rims 8 are further connected to each other by a transverse support 14 on which a bearing, not shown, is secured in which the reduced part of a step-shaped bushing 15 is rotatably mounted, the larger part of which is secured to the rotary table 3. This bushing 15 likewise has a large round central aperture 16 of a diameter of, for example, 200 mm, which may or may not also extend through the table 3, depending upon the particular use of this aperture. The larger free part of bushing 15 carries a sprocket wheel rim 17 which, as indicated in dotted lines in FIG. 1, is connected by an endless drive chain 18 to a sprocket wheel 19 which is secured to one end of a shaft 20 which is rotatably mounted within the left wheel rim 8 of the gyrowheel 2. The other end of shaft 20 extends radially through and is rotatably mounted in the left hub 11 and carries within the aperture 12 of this hub a bevel gear 21 which meshes with another bevel gear 22 on the drive shaft of a motor 23 which is rotatable about the axis 6. Thus, the rotary table 3 may be driven about the secondary axis of rotation 13, for example, in the direction of the arrow 24. The aperture 12 of the left hub 11 is large enough to receive the pair of bevel gears 21 and 22 and it may also receive a simple tachometer.

Instead of this manner of driving the rotary table 3, it is also possible to mount a motor 25 on the gyrowheel 2 itself, for example, on the left wheel rim 8 as indicated in dot-and-dash lines in FIG. 1, and to connect this motor by a slip ring, not shown, to a source of current in a stationary position at the outside of the gyrowheel. Such a slip ring may likewise be mounted within the large aperture 12 of hub 11. Motor 25 may then drive the sprocket wheel 19 directly which is connected by the chain 18 to the sprocket wheel rim 17 for driving the rotary table 3. The wheel rim 8 carrying the motor 25 may be provided in a position diametrically opposite to this motor with one or more weights 26 for compensating the weight of the motor.

The main drive of the gyrowheel 2 for rotating it about the horizontal main axis 6, for example, in the direction of the arrow 27, consists of a motor 28 the shaft 29 of which carries a pulley or sprocket wheel 30, as shown in FIG. 2 but omitted in FIG. 1, which is connected by one or more endless V-belts or a chain 31 to the left wheel rim 8 by running over V-shaped grooves or teeth in or on the outer periphery of wheel rim 8. Instead of running the V-belt or chain 31 over a wheel rim 8, FIG. 2 also indicates in dot-and-dash lines that one of the hubs 11 may be provided with a pulley or gear rim over which a V-belt or chain 32 may run from the pulley or sprocket wheel 30 on the shaft 29 of motor 28. It is further possible to drive the gyrowheel 2 by means of at least one of the supporting rollers 9 which may then have a pulley or sprocket wheel secured thereto which is driven by a belt or chain by the motor 28. In this case, the respective supporting roller 9 may form a gear and the associated wheel rim 8 may be provided on its outer periphery with gear teeth which engage with the teeth of this roller 9. Of course, instead of supporting this wheel rim 8 directly on the teeth of a supporting roller 9, the peripheral surfaces of the associated supporting roller 9 and wheel rim 8 may also be smooth and this roller and wheel rim may be provided laterally of these smooth surfaces with gear teeth. While these gear teeth on the supporting roller may be integral with the latter, the gear teeth on wheel rim 8 may be those of a separate gear rim which is secured to one lateral side of the wheel rim.

The aperture 12 in the hub ring 11 at the right side of FIG. 1 is so large that within the axis 6 this aperture 12 will easily accomodate conventional rotary joints (not shown) of connecting pipes 33 and 34 through which a heating or cooling medium may be supplied to the discharged from the mold 4 which in FIGS. 1 to 3 is provided with outer and inner walls. These pipes 33 and 34 may extend, for example, radially through the right wheel rim 8, as shown in FIG. 1, and then transversely thereto to the aperture 16 of bushing 15 and then by means of rotary joints (not shown) in the direction of the axis 13 through this aperture and then through the outer bottom wall of the double-wall mold 4 for directly heating or cooling the inner wall of the mold by the flow of the heating or cooling medium. Since the apertures 12 and 16 may be made of a very large size, the pipe lines and rotary pipe joints may also have a very large cross-sectional size so that very large quantities of the heating or cooling medium may be supplied to and discharged from the mold 4 without requiring the pump pressure to be increased and thus without danger that the outer and inner walls of the mold might be deformed or damaged by the pressure of the respective medium flowing between these walls.

By means of quick-action coupling, not shown, which may be opened from a position underneath the bearing in the transverse support 14, mold 4 may be disconnected from the rotary table 3 and be lifted out of the gyrowheel 2 in the direction of the arrow 35.

Figure 4:
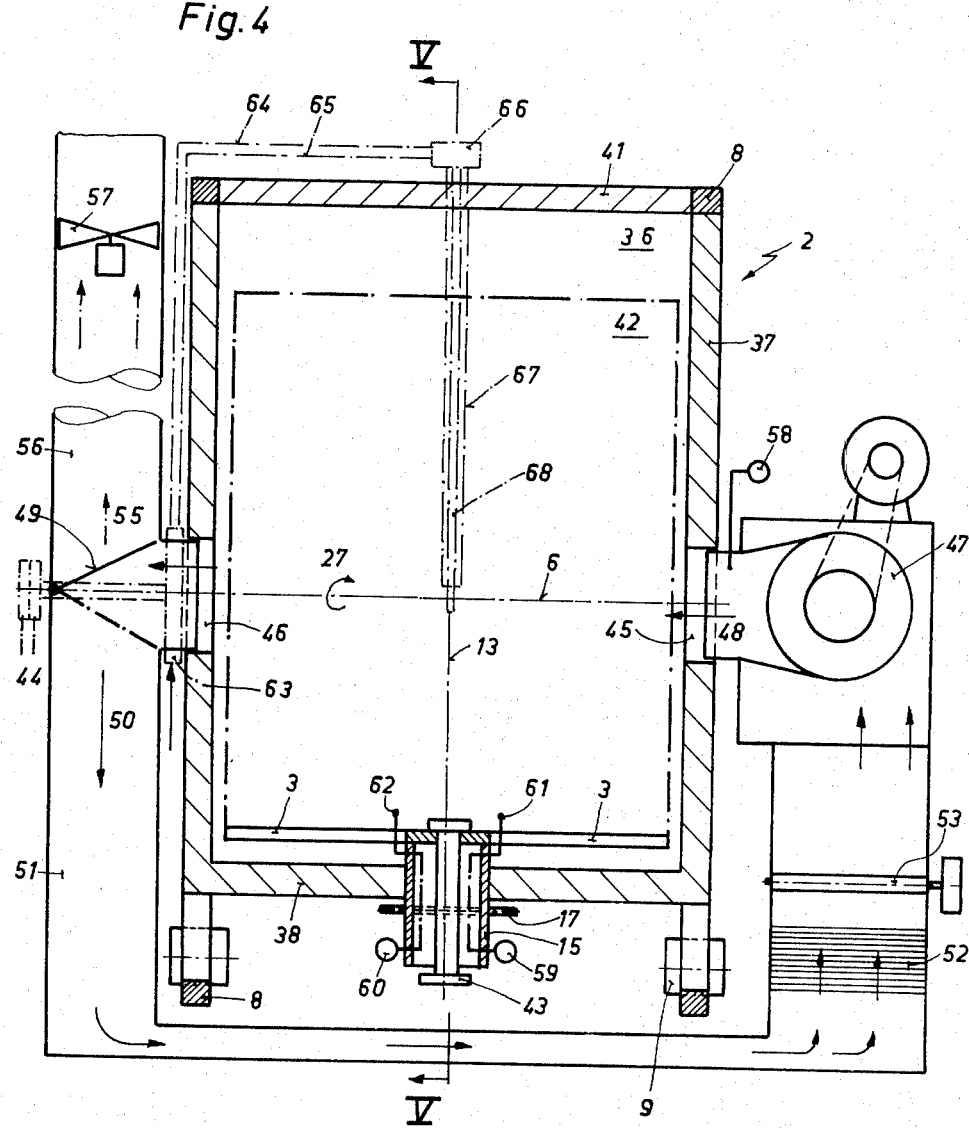
FIG. 4 shows a cross section which is taken along the line IV — IV of FIG. 5 of a rotary molding machine according to a second embodiment of the invention.
Figure 5:
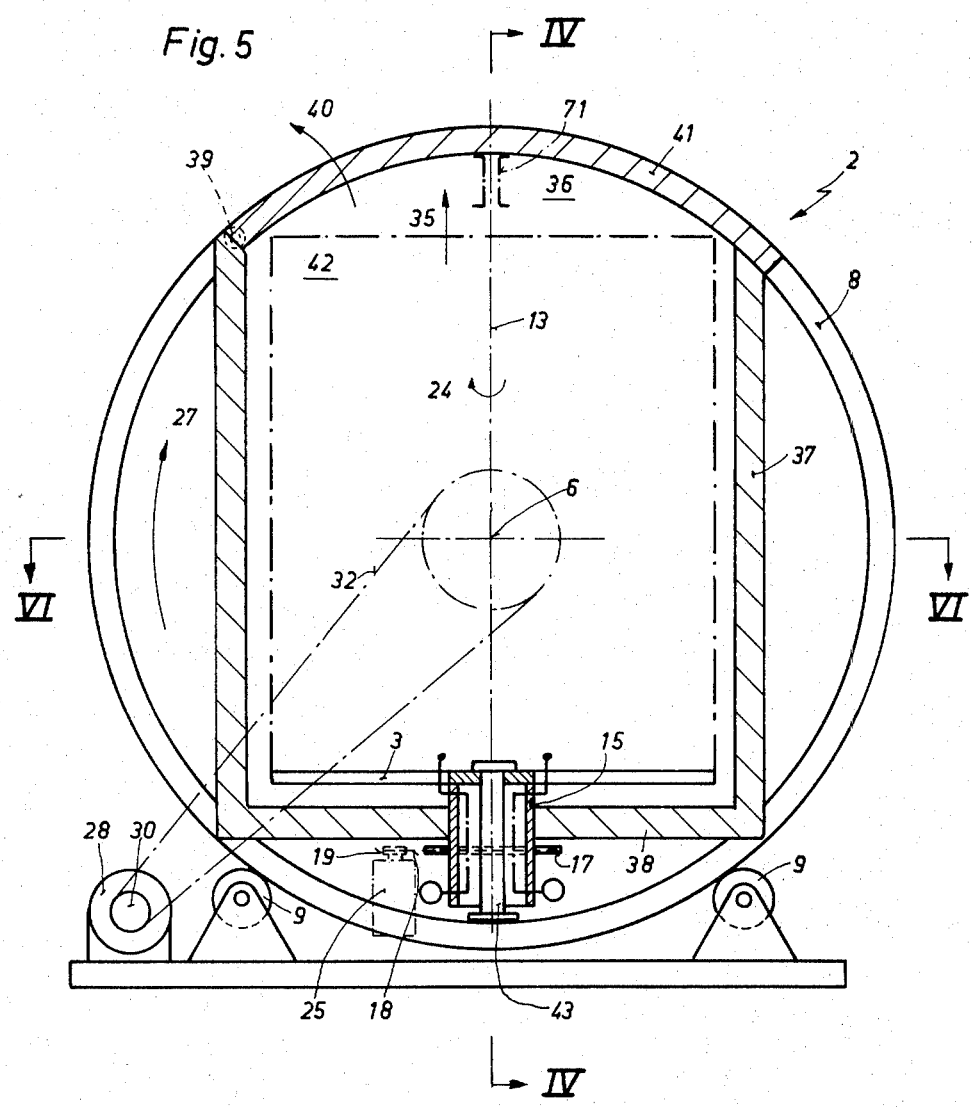
FIG. 5 shows a cross section which is taken along the line V — V of FIG. 4.

FIGS. 4 to 6 illustrate another embodiment of the invention, the gyrowheel 2 of which is principally the same as that described with reference to FIGS. 1 to 3. The two wheel rims 8 of this gyrowheel run on supporting rollers 9 and are rotatable about a horizontal axis 6. As shown diagrammatically in FIG. 5, this gyrowheel 2 may be driven by a motor 28 the shaft of which carries a sprocket wheel 30 which is connected by an endless chain 32 to another sprocket wheel on one of the hubs of the gyrowheel for rotating the latter, for example, in the direction of the arrow 27.

This gyrowheel 2 according to FIGS. 4 to 6 contains a furnace chamber 36 which consists of heat-insulated walls 37, a bottom 38 and a cover 41 which is adapted to be opened when pivoted about the axis of a hinge 39 in the direction of the arrow 40. The walls 37 and the bottom 38 of the furnace chamber 36 connected to two wheel rims 8 of the gyrowheel to each other. At the inside of furnace chamber 36 a hollow mold 42 with single walls is mounted on the rotary table 3 which like the table 3 as shown in FIGS. 1 to 3 is rotatable about a secondary axis 13 in the direction 24. The bushing 15 of table 3 extends through the bottom 38 of furnace chamber 36 and a quick-action coupling 43 may be disengaged from the outside underneath the bottom 38 for releasing the mold 42 from the rotary table 3. After the cover 41 has been pivoted to its open position, mold 42 may then be lifted out of the furnace chamber 36 in the direction of the arrow 35. If the molded products are to be removed from the mold 42 while the latter remains on the rotary table 3, they are likewise removed in the direction of the arrow 35.

For driving the rotary table 3, the other part of bushing 15 again carries a sprocket gear rim 17 which may be driven by a motor 25 by means of a sprocket gear 19 on the shaft of this motor and a chain connecting this gear 19 to the gear rim 17. Motor 25 is again mounted on the gyrowheel 2 and the current for its operation may be supplied, for example, by slip rings 44, as indicated in dot-and-dash lines in FIG. 4.

As further shown in FIGS. 4 to 6, the furnace chamber 36 has a large inlet opening 45 of a diameter of, for example, 200 mm in one wheel rim 8, that is, coaxial to the horizontal main axis 6 of the gyrowheel 2, and an outlet opening 46 of a similar size in the other wheel rim 8 for passing a heating or cooling medium into and from the furnace chamber 36. Thus, for example, hot air as heating medium may be blown by a blower 47 in the direction 48 through the inlet 45 and will then flow around the mold 42 and pass out of the furnace chamber 36 through the outlet 46. By means of an adjustable flap 49, the air is then deflected in the direction of the arrow 50 into a channel 51 and then flows back to a heater or radiator 52 from which the reflected air is drawn by the blower 47 through an adjustable flap 53 and is blown again through the inlet 45. If desired, an additional suction fan may also be provided.

For cooling the mold, the flaps 49 and 53 are shifted to their other sides. Fresh air is then drawn by the blower 47 through a mixing chamber 54 in which it is mixed with moist air so as to increase its surface-cooling action and this air is then passed by the blower in the direction of the arrow 48 through the inlet 45 into the furnace chamber 36 and then from the latter through the outlet 46 against the downwardly pivoted flap 49 which then deflects the air upwardly in the direction of the arrow 55 into a channel 56 from which it may then be drawn off to the outside by an additional fan 57. For simplicity's sake these parts which are located behind the outlet 46 are omitted in FIG. 6.

At the inside of the inlet 45, the temperature of the air is measured by a measuring instrument 58, while the temperature within the mold 42 is measured by two measuring instruments 59 and 60 which are located on the section of bushing 15 of the rotary table 3 underneath the bottom 38 of the furnace chamber and from which primary measuring elements 61 and 62 extend into the mold 42 for measuring the temperature of the mold and of the plastic material therein. By means of wireless transmitters of a known type, the measured results are then transmitted from the measuring instruments 59 and 60 to any suitable point at the outside of the molding machine.

The manner of mounting the gyrowheel permits, for example, at the side of the outlet 46, to pass water or nitrogen or additional plastic or other means through a rotary joint 63, pipe lines 64 and 65 and a rotary joint 66 and pipes 67 and 68 which are located within the secondary axis 13 to the inside of mold 42.

FIG. 7 illustrates a modification of the inlet 45 into the furnace chamber 36. This inlet is designed similar to a diffusor and it increases conically in diameter up to the total height of the furnace chamber 36. Such a diffuserlike inlet produces a better distribution of the air in the directions of the arrows 48.

FIG. 8 shows a highly reduced view of another embodiment of the invention, in which the dimensions of the hollow mold 42 and the furnace chamber 36 are much larger than the diameter of the wheel rims 8 of the gyrowheel 2. Thus, the mold 42 may have, for example, a height of 5 m and a width of 3 m. For carrying such a huge mold 42, the rotary table (not shown) is mounted radially outside of the wheel rims 8 between the mold 42 and the furnace chamber 36 and its bearing means are mounted on a frame 69 which projects radially outwardly from the wheel rims but is secured to the inner sides thereof, that is, inwardly of the rollers 9. Within the center of rotation of this gyrowheel 2, the inlet and outlet apertures for the heating or cooling medium may be of the same large size as those of the gyrowheel as shown in FIGS. 4 to 6. Because of its large size, the entire molding machine as shown in FIG. 8 may be mounted on the bottom of a pit 70, as indicated in dot-and-dash lines, so as not to project too far upwardly from the normal floor or ground level.

Of course, numerous modifications of the invention are possible without departing from its general scope. The inlet and outlet apertures at the center of rotation of the gyrowheel may be made of a considerably larger size than illustrated in the drawings and any of the different driving means as indicated in FIGS. 1 to 3 may also be employed in the machines as illustrated in FIGS. 4 to 8, or vice versa. Instead of using air or a mixture of air and water as a heating or cooling medium, it is also possible to use any other suitable medium for this purpose. Spray tubes may also be provided within the furnace chamber 36. Furthermore, it is possible to provide several rotary tables 3 within the gyrowheel 2, for example, laterally adjacent to each other or in a starlike formation about the main axis 6. The entire molding machine may also consist of two gyrowheel units which are alternately operated and alternately connected to the heating or cooling side of the machine, and one of which is rotated, while the molded products are removed from the other unit. Furthermore, the entire gyrowheel as illustrated in FIGS. 1 to 3 may also be inserted into a stationary furnace chamber which may then be opened and closed, for example, by a door which forms a closure of one lateral side of the gyrowheel.

Furthermore, as indicated in dot-and-dash lines in FIGS. 2 and 5, a second bearing 71 may be provided diametrically opposite to the rotary table 3 on the gyrowheel 2 or on the cover 41 of the furnace chamber 36 as an additional support for rotating the mold 4 or 42 about the secondary axis 13.

In some cases it is also possible to insert a hollow mold into the machine the diameter of which is larger than the distance between the two wheel rims 8 of the gyrowheel 2 so that the mold will project at both sides through the wheel rims 8. The spokes 10 of the wheel rims must then be omitted or be made of an angular shape.

All of the driving means for rotating the gyrowheel about the main axis 6 and the rotary table 3 together with the mold about the secondary axis 13 may be time-controlled and their speeds may be infinitely variable.

Finally the rotary table 3 may either be a solid platform or consist of any other suitable means for carrying a mold, for example, of two or more intersecting bars or the like.

Although my invention has been illustrated and described with reference to the preferred embodiments thereof, I wish to have it understood that it is in no way limited to the details of such embodiments but is capable of numerous modifications within the scope of the appended claims.

Having thus fully disclosed by invention, what I claim is:

1. A rotary molding machine for producing articles comprising a rotary frame of a shape similar to that of a Rhönwheel having a pair of parallel substantially vertical wheel rims and means connecting said rims to each other, supporting rollers underneath and rotatably supporting said rims, means for rotating said frame about a substantially horizontal axis, a rotary table adapted to have a mold detachably mounted thereon, means for rotatably mounting said rotary table between said rims, means for driving said rotary table together with said mold relative to said frame about an axis extending at an angle to said horizontal axis, and means provided on said rotary frame for selectively heating and cooling said mold.

2. A rotary molding machine as defined in claim 1, in which said driving means for said rotary frame are connected to at least one of said supporting rollers for rotating the same and for thus also rotating said frame.

3. A rotary molding machine as defined in claim 1, in which said driving means for said rotary frame comprise at least one of an endless belt or a chain adapted to run over the outer periphery of at least one of said wheel rims and to take along said rim.

4. A rotary molding machine as defined in claim 1, in which each of said wheel rims has a central hublike member having a large round central aperture, and spokes connecting each of said hublike members to the associated wheel rim for reinforcing the same.

5. A rotary molding machine as defined in claim 1, further comprising a tubular bushing having a large inner diameter secured to one side of said rotary table and extending coaxially thereto for rotatably mounting said table within said rotary frame.

6. A rotary molding machine as defined in claim 5, in which said driving means for said rotary table comprise a sprocket-wheel rim secured to said bushing, a sprocket wheel rotatably mounted on one of said wheel rims, and a driving chain connecting said sprocket wheel to said sprocket-wheel rim.

7. A rotary molding machine for producing plastic articles comprising a rotary frame of a shape similar to that of a Rhönwheel having a pair of parallel substantially vertical wheel rims and means connecting said rims to each other, supporting rollers underneath and rotatably supporting said rims, means for rotating said frame about a substantially horizontal axis, a rotary table rotatably mounted between said rims and adapted to have a mold mounted thereon, and means for driving said rotary table together with said mold relative to said frame about an axis extending at an angle to said horizontal axis comprising a motor mounted on one of said wheel rims, and a slip ring coaxial with one of said hub-like members for connecting said motor to a source of current at the outside of said rotary frame.

8. A rotary molding machine as defined in claim 7, in which a weight is mounted on said wheel rim carrying said motor at a position diametrically opposite to said motor for balancing the weight thereof.

9. A rotary molding machine as defined in claim 1, wherein said means for selectively heating and cooling include a furnace chamber surrounding said mold and having heat-insulated walls, said bushing extending through the bottom wall of said furnace chamber, said driving means for said rotary table being disposed outside of said furnace chamber.

10. A rotary molding machine for producing plastic articles comprising a rotary frame of a shape similar to that of a Rhönwheel having a pair of parallel substantially vertical wheel rims and means connecting said rims to each other, supporting rollers underneath and rotatably supporting said rims, drive means for rotating said rotary frame about a substantially horizontal axis, a rotary table rotatably mounted between said rims and adapted to have a mold mounted thereon, said mold having single walls and means for driving said rotary table together with said mold relative to said frame about an axis extending at an angle to said horizontal axis, a furnace chamber within said rotary frame and surrounding said mold and having heat-insulated walls, said walls of said furnace chamber, extending vertically and perpendicularly to said horizontal axis and being opposite to one another, placed in the plane and in the interior of the respective wheel rim and reinforcing the same, around said horizontal axis said vertical walls of said furnace chamber having large apertures to serve as an inlet and outlet for a flowing medium blown into the interior of said furnace chamber and flowing around said mold for heating and cooling said mold, and a tubular bushing extending through the bottom wall of said furnace chamber, said driving means for rotary table being disposed outside of said furnace chamber.

11. A rotary molding machine for producing plastic articles comprising a rotary frame of a shape similar to that of a Rhönwheel having a pair of parallel substantially vertical wheel rims and means connecting said rims to each other, supporting rollers underneath and rotatably supporting said rims, means for rotating said frame about a substantially horizontal axis, a rotary table rotatably mounted between said rims and adapted to have a mold mounted thereon, means for driving said rotary table together with said mold relative to said frame about an axis extending at an angle to said horizontal axis, a tubular bushing having a large inner diameter secured to one side of said rotary table and extending coaxially thereto for rotatably mounting said table within said rotary frame, and a furnace chamber within said rotary frame and surrounding said mold and having heat-insulated walls, said walls of said furnace chamber extending vertically and perpendicularly to said horizontal axis and being opposite one another, said bushing extending through the bottom wall of said furnace chamber, said driving means for said rotary table being disposed outside of said furnace chamber, the opposite vertical walls of said furnace chamber around said horizontal axis being provided with large apertures to serve as an inlet and outlet for a flowing medium for selectively heating and cooling said mold, the wall of at least one of said apertures having a diffuserlike shape and substantially forming one side wall of said furnace chamber and increasing conically in diameter substantially to the upper and lower walls of said furnace chamber.

12. A rotary molding machine for producing plastic articles comprising a rotary frame of a shape similar to that of a Rhönwheel having a pair of parallel substantially vertical wheel rims and means connecting said rims to each other, supporting rollers underneath and rotatably supporting said rims, means for rotating said frame about a substantially horizontal axis, a rotary table mounted between said rims and adapted to have a mold mounted thereon, means for driving said rotary table together with said mold relative to said frame about an axis extending at an angle to said horizontal axis, a tubular bushing having a large inner diameter secured to one side of said rotary table and extending coaxially thereto for rotatably mounting said table with said rotary frame, at least one temperature measuring instrument on the outer end of said bushing and rotatable therewith, primary measuring elements connected to said instrument and extending through said rotary table into said mold for measuring at least the temperature within said mold, and at least one wireless transmitter for transmitting the temperature values measured by said measuring elements and said instrument to a point remote from said instrument.

13. A rotary molding machine as defined in claim 9, further comprising quick-action coupling means for quickly securing said mold to said rotary table and for quickly releasing it therefrom from a position at the outer side of said bottom wall of said furnace chamber.

14. A rotary molding machine as defined in claim 1, in which said rotary table for supporting said mold is rotatably mounted radially outside of said wheel rims, and further comprising a frame secured to and extending radially outwardly from said wheel rims and bearing means on said frame for rotatably mounting said table.

15. A rotary molding machine as defined in claim 1, further comprising bearing means mounted on said rotary frame diametrically opposite to said rotary table and within the axis of rotation thereof for rotatably supporting the end of said mold opposite to the end which is supported on said table.

16. A rotary molding machine as defined in claim 10, in which said driving means for said rotary frame comprise at least one of an endless belt or a chain adapted to run over the outer periphery of at least one of said wheel rims and to take along said rim.

17. A rotary molding machine according to claim 10, wherein one hublike member of one of said wheel rims has a gear rim and said driving means for said rotary frame includes a chain engaging said gear rim.

18. A rotary molding machine as defined in claim 10, in which said driving means for said rotary table comprises a sprocket-wheel rim secured to said bushing, a sprocket wheel rotatably mounted on one of said wheel rims, and a driving chain connecting said sprocket wheel to said sprocket-wheel rim.

19. A rotary molding machine as defined in claim 10, in which said means for driving said rotary table comprises a motor mounted on one of said wheel rims, and a slip ring coaxial with said rotary frame for connecting said motor to a source of current at the outside of said rotary frame.

20. A rotary molding machine as defined in claim 10, further comprising at least one temperature measuring instrument on the outer end of said bushing rotatable therewith, primary measuring elements connected to said instrument and extending through said rotary table into said mold for measuring at least the temperature within said mold, and at least one wireless transmitter for transmitting the temperature values measured by said measuring elements and said instrument to a point remote from said instrument.

21. A rotary molding machine according to claim 10, wherein the dimensions of said mold are much larger than the diameter of the wheel rim, said rotary table for supporting said mold is rotatable mounted radially outside the diameter of said wheel rim and a frame is secured to and extends radially outwardly from said wheel rims and bearing means are provided on said frame for rotatably mounting said table.

22. A rotary molding machine for producing plastic articles comprising a rotary frame of a shape similar to that of a Rhönwheel having a pair of parallel substantially vertical wheel rims and means connecting said rims to each other, supporting rollers underneath and rotatably supporting said rims, driving means for rotating said frame about a substantially horizontal axis, a rotary table rotatably mounted between said rims and adapted to have a hollow mold mounted thereon, said hollow mold being provided with double walls between which a heating and cooling liquid is conducted, and means for driving said rotary table together with said mold relative to said frame about an axis extending at an angle to said horizontal axis, each of said wheel rims having a central hublike member having a large round central aperture, and connecting means for connecting each of said hublike members to the associated wheel rim for reinforcing the same, said rotary table including a tubular bushing having a large inner diameter secured to one side of said rotary table and extending coaxially thereto for rotatably mounting said table within said rotary frame.

23. A rotary molding machine according to claim 22, wherein the dimensions of said mold are much larger than the diameter of the wheel rim, said rotary table for supporting said mold is rotatably mounted radially outside the diameter of said wheel rims and a frame is secured to and extends radially outwardly from said wheel rims and bearing means are provided on said frame for rotatably mounting said table.

* * * * *